United States Patent
Guo et al.

(10) Patent No.: US 12,244,701 B2
(45) Date of Patent: Mar. 4, 2025

(54) OAM MEASUREMENT DEVICE INDEPENDENT QUANTUM KEY DISTRIBUTION SYSTEM BASED ON REAL-TIME TRACKING COMPENSATION AND METHOD THEREOF

(71) Applicant: GUANGDONG INCUBATOR TECHNOLOGY DEVELOPMENT CO., LTD, Guangdong (CN)

(72) Inventors: Banghong Guo, Guangdong (CN); Yilong He, Guangdong (CN)

(73) Assignee: GUANGDONG INCUBATOR TECHNOLOGY DEVELOPMENT CO., LTD, Guangzhou (CN)

( * ) Notice: Subject to any disclaimer, the term of this patent is extended or adjusted under 35 U.S.C. 154(b) by 121 days.

(21) Appl. No.: 17/361,387

(22) Filed: Jun. 29, 2021

(65) Prior Publication Data

US 2022/0029798 A1    Jan. 27, 2022

Related U.S. Application Data

(63) Continuation of application No. PCT/CN2019/129490, filed on Dec. 27, 2019.

(30) Foreign Application Priority Data

Dec. 29, 2018 (CN) .......................... 201811634554.1

(51) Int. Cl.
*H04L 9/08* (2006.01)
*G02B 27/00* (2006.01)
(Continued)

(52) U.S. Cl.
CPC ........ *H04L 9/0858* (2013.01); *G02B 27/0068* (2013.01); *H04B 10/54* (2013.01); *H04B 10/614* (2013.01); *H04L 9/3215* (2013.01)

(58) Field of Classification Search
CPC ... H04L 9/0858; H04L 9/0852; H04L 9/3215; H04L 63/1416; H04L 63/145;
(Continued)

(56) References Cited

U.S. PATENT DOCUMENTS

2016/0359624 A1    12/2016    Kim et al.

FOREIGN PATENT DOCUMENTS

| CN | 105391547 A | 3/2016 |
| CN | 105406962 A | 3/2016 |

(Continued)

OTHER PUBLICATIONS

Chuan-Qi Liu et al., Polarization-Encoding-Based Measurement-Device-Independent Quantum Key Distribution with a Single Untrusted Source, Chinese Physics Letters, 2016, pp. 100301-1 to 100301-4, vol. 33, No. 10, Chinese Physical Society and IOP Publishing Ltd.

(Continued)

*Primary Examiner* — Brian F Shaw

(57) ABSTRACT

The disclosure discloses an OAM measurement device independent quantum key distribution system based on real-time tracking compensation and method thereof, which comprises a user side Alice, a user side Bob and a measuring unit; the user side Alice and the user side Bob realize real-time monitoring and phase distortion compensation of the channel environment by using strong pulse lasers from the measuring unit; the measuring unit utilizes an M-Z interferometer formed by a Dove prism to realize the separation of odd/even orbital angular momentum order photons, and measure Bell states of the photons with orbital angular momentum; the disclosure realizes OAM measurement device independent quantum key distribution system based on real-time tracking compensation, and the user uses the (Continued)

orbital angular momentum state for coding, thereby having the characteristics of good stability, high code rate and strong expansibility.

19 Claims, 3 Drawing Sheets

(51) Int. Cl.
*H04B 10/54* (2013.01)
*H04B 10/61* (2013.01)
*H04L 9/32* (2006.01)

(58) Field of Classification Search
CPC ....... H04L 7/0008; H04L 7/0075; H04L 7/00; G02B 27/0068; H04B 10/54; H04B 10/614; H04B 10/112; H04B 10/70; H04B 10/503
See application file for complete search history.

(56) References Cited

FOREIGN PATENT DOCUMENTS

| CN | 106712940 A | 5/2017 |
|----|-------------|--------|
| JP | 2017130932 A | 7/2017 |
| JP | 2018137739 A | 8/2018 |

OTHER PUBLICATIONS

Le Wang et al., Free-Space Measurement-Device-Independent Quantum-Key-Distribution Protocol Using Decoy States with Orbital Angular Momentum, Chinese Physics B, 2015, pp. 120307-1 to 120307-8, vol. 24, No. 12, Chinese Physical Society and IOP Publishing Ltd.
Chen, Dong et al., Measurement-device-independent quantum key distribution with pairs of vector vortex beams, Physical Review A, 2016, pp. 1-5, vol. 93, No. 032320.
Choi, Yujun et al., Plug-and-Play Measurement-Device-Independent Quantum Key Distribution, Mar. 17, 2016, pp. 1-7.

OAM MEASUREMENT DEVICE INDEPENDENT QUANTUM KEY DISTRIBUTION SYSTEM BASED ON REAL-TIME TRACKING COMPENSATION AND METHOD THEREOF

CROSS REFERENCE TO RELATED APPLICATIONS

The present disclosure is a Continuation Application of PCT Application No. PCT/CN2019/129490 filed on Dec. 27, 2019, which claims the benefit of Chinese Patent Application No. 201811634554.1 filed on Dec. 29, 2018. All the above are hereby incorporated by reference in their entirety.

TECHNICAL FIELD

The disclosure relates to the technical field of quantum information and optical communication, and more particularly relates to an OAM measurement device independent quantum key distribution system based on real-time tracking compensation and method thereof.

BACKGROUND

Since the first Quantum Key Distribution protocol was introduced in 1984, Quantum Key Distribution (QKD) has been considered as a very feasible technique in Quantum information science. QKD allows two remote users (Alice and Bob) to generate a key with theoretically unconditional security according to the law of quantum physics. However, in real-world environments, there is a gap between the ideal model and the actual device. For example, an ideal QKD protocol requires an ideal single photon source and detector to ensure its safety. It is hard to achieve an ideal single photon source and detector with current technology. The non-ideality of these devices makes QKD systems vulnerable to various attacks, such as photon number splitting attacks, time-shifting attacks, blinding attacks, etc.

To overcome these difficulties, a concept of Device independent Quantum Key Distribution (DI-QKD) has been proposed. The security of the DI-QKD is not dependent on the characteristics of the device, which means that a quantum hacker cannot exploit this deficiency to steal any information, even if the device is not ideal. Therefore, DI-QKD can always guarantee unconditional theoretical safety. However, the implementation of DI-QKD is a difficult challenge, which requires perfect Bell-state measurements and very efficient single photon detection techniques, which are difficult to achieve with the existing technologies. However, the recently proposed Measurement Device Independent Quantum Key Distribution protocol (MDI-QKD) shortens the distance between DI-QKD and practical use, achieves partial QKD Device Independent Quantum communication, and eliminates all security holes related to detection. Meanwhile, the protocol introduces a scheme of decoy state, converts the photon state into a mixed state of photon number by using phase randomization, which can well prevent photon number splitting attack. Various MDI-QKD implementations have been developed, such as polarization-coding, phase-coding, and time-bin-coding.

The MDI-QKD protocol solves all loopholes of a quantum key system measuring end at one time, but there is still loopholes influencing safety in a light source part, a modulation part, a side channel part and the like, for example, the traditional MDI-QKD (patent: CN106712940) introduces a weak coherent light source in combination with a decoy state, which reduces the requirement of the MDI-QKD system on the light source, but both parties of users use independent light sources respectively, and the spectrums of the emitted light are inconsistent. By utilizing the difference, a quantum hacker can distinguish the source of the photon and further steal the key information of the user. To solve the problem of inconsistent spectrum, plug-and-play MDI-QKD is proposed (Article: Liu, C.Q.at. (2016) Polarization-Encoding-Based Measurement-Device-Independent Quantum Key Distribution with a Single unordered source, Chinese Physics Letters, 33 (10)), but the modulation scheme has the problem of incomplete matching of a measuring base reference system, which increases the error rate. In view of the above, recently proposed MDI-QKD scheme based on Orbital Angular Momentum (OAM) coding solves the problem of incomplete matching of reference system (Article: Wang L, Zhao S M, Gong L Y, et al, Free-space measurement-device-independent quantum-key-distribution protocol using with orthogonal irregular absorption spectrum [J] Chinese Physics B, 2015, 24 (12): 120307.), reduces bit error rate, but has the problem of spectrum inconsistency, and there is no good monitoring method and signal compensation method for channel environment, so the performance of the weak signal quantum key distribution system is very easily affected by external environment.

Summary of Disclosure

The present disclosure is directed to overcome the above-mentioned deficiencies of the prior art, and to provide an OAM measurement device independent quantum key distribution system based on real-time tracking compensation, in which a measuring unit transmits an intensive light pulse to a user by using a pulse laser device, a polarization beam splitter, and a beam splitter. The user utilizes a Charge coupled device (CCD) and a beam splitter for monitoring and synchronization, performs phase distortion compensation through a deformable mirror, and utilizes an intensity modulator and a spatial light modulator to randomly generate decoy state photons and signal state photons of orbital angular momentum with the number of the photons less than 1, and sends the photons to a middle measuring unit. The measuring unit measures the photon state sent by the user and publishes the measuring result, and the user locally generates a consistent key after the processes of base comparison, key agreement and the like according to the response condition of the measurement.

Another objective of the present disclosure is to provide an OAM measurement device independent quantum key distribution method based on real-time tracking compensation, which can naturally implement matching of spectrum modes, and can conveniently implement real-time channel monitoring, pulse intensity measurement and atmospheric turbulence intensity measurement, clock synchronization, and the like.

In order to achieve the purpose of the disclosure, the technical scheme of the disclosure is as follows:

an OAM measurement device independent quantum key distribution system based on real-time tracking compensation, comprising: a user Alice, a user Bob and a measuring unit;

the user Alice and the user Bob are connected with the measuring unit through quantum channels, wherein:

the measuring unit comprises: the system comprises a first telescope system, a second telescope system, a first 50/50 beam splitter, a first polarization beam splitter, a pulse laser device, a first reflector, a second reflector, a third reflector and a fourth reflector, a first M-Z interferometer and second M-Z interferometer, and a first single photon detector, a second single photon detector, a third single photon detector and a fourth single photon detector; when the pulse laser device of the measuring unit emits a fundamental mode Gaussian pulse, the fundamental mode Gaussian beam with the polarization mode of vertical polarization is reflected to a first 50/50 beam splitter and split into 2 beams through screening of the first polarization beam splitter, then is respectively reflected by the first reflector and the second reflector, and afterwards is collimated by the first telescope system and the second telescope system and is finally respectively transmitted to the user Alice and the user Bob through quantum channels;

the user Alice and the user Bob respectively perform channel environment real-time monitoring, phase distortion compensation and orbital angular momentum encoding on the fundamental mode Gaussian pulse from the measuring unit and then send the fundamental mode Gaussian pulse to the measuring unit;

when the first telescope system and the second telescope system of the measuring unit respectively receive signal pulses from a user Alice and a user Bob, the signal pulses are reflected by the first reflector and the second reflector, then are interfered at a third 50/50 beam splitter, the interfered pulses respectively enter the first M-Z interferometer and the second M-Z interferometer after being respectively reflected by the third reflector and the fourth reflector; and then the pulses enter the first single photon detector, the second single photon detector, the third single photon detector and the fourth single photon detector to cause response and output measuring results after being separated by the first M-Z interferometer and the second M-Z interferometer; and the user Alice and the user Bob locally generate consistent keys after the processes of base comparison, key agreement and the like according to the measured response condition.

Preferably, the user Alice comprises: a third telescope system, a first narrow band filter, a first beam splitter, a first Charge coupled device (CCD), a first delayer, a second polarization beam splitter, a first deformable mirror, a second deformable mirror, a first half-wave plate, a first spatial light modulator and a first intensity modulator;

the user Bob comprises: a fourth telescope system, a second narrow-band filter, a second beam splitter, a second Charge coupled device (CCD), a second delayer, a third polarization beam splitter, a third deformable mirror, a fourth deformable mirror, a second half-wave plate, a second spatial light modulator and a second intensity modulator.

Preferably, the first spatial light modulator, the second spatial light modulator and the first intensity modulator, the second intensity modulator randomly modulate Gaussian pulses;

when the first spatial light modulator and the second spatial light modulator encode orbital angular momentum, the first spatial light modulator and the second spatial light modulator randomly select one of four states $$\left\{|o\rangle, |e\rangle, \frac{1}{\sqrt{2}}(|o\rangle+|e\rangle), \frac{1}{\sqrt{2}}(|o\rangle-|e\rangle)\right\}$$

for encoding; wherein $\{|o\rangle, |e\rangle\}$ is X base;

$$\left\{\frac{1}{\sqrt{2}}(|o\rangle+|e\rangle), \frac{1}{\sqrt{2}}(|o\rangle-|e\rangle)\right\}$$

is Y base, and $|o\rangle$ and $$\frac{1}{\sqrt{2}}(|o\rangle+|e\rangle)$$

represents bit 0; and $|e\rangle$ and $$\frac{1}{\sqrt{2}}(|o\rangle+|e\rangle)$$

represents bit 1; and $|o\rangle$ and $|e\rangle$ respectively represent orbital angular momentum states of odd topological charge numbers and orbital angular momentum states of even topological charge numbers; the first intensity modulator and the second intensity modulator accurately generate the photons in the decoy state and the signal state with different average photon number intensities.

Preferably, the third telescope system and the fourth telescope system each comprise two confocal convex lenses for controlling the size of the laser pulse and the far-field divergence angle of the Gaussian pulse; the first narrow-band filter and the second narrow-band filter are provided for filtering light out of a communication waveband; the first beam splitter and the second beam splitter divide incident Gaussian pulse into two paths of strong fundamental mode Gaussian pulse and weak pulser laser, namely a strong upper branch and a weak lower branch; the first Charge coupled device (CCD) and the second Charge coupled device (CCD) are provided for monitoring the intensity of laser pulses and wavefront phase distortion caused by atmospheric turbulence in real time and providing reference information for clock synchronization and phase distortion compensation of the lower branch; the second polarization beam splitter and the third polarization beam splitter transmit the horizontal polarization light and reflect the vertical polarization light; the first deformable mirror, the second deformable mirror, the third deformable mirror and the fourth deformable mirror are also called wavefront correctors, which may change the optical path of the wave front transmission or change the refractive index of a transmission medium to change the phase structure of the wave front of the incident light according to the reference information of phase distortion, so as to achieve the purpose of compensating the wave phase of the light wave; the principal sections of the first half-wave plate and the second half-wave plate are provided at an angle of 45 degrees with the polarization surface of incident light, and the polarization direction of the incident light may be rotated by 90 degrees; the first spatial light modulator and the second spatial light modulator are phase-only reflective liquid crystal spatial light modulators, which are active digital optical devices based on liquid crystal molecule electro-birefringence effect, and provided for modulating orbital angular momentum of Gaussian pulses; the first intensity modulator and the second intensity modulator may accurately generate the decoy state photons and the signal state photons with different average photon number intensities.

Preferably, the third telescope system of the user Alice receives the Gaussian pulser from the measuring unit, then filters light out of a communication band through the first narrow band filter, and divides the incident Gaussian pulse into two paths of strong fundamental mode Gaussian pulse and weak pulser laser through the first beam splitter, namely a strong upper branch and a weak lower branch; the upper branch is connected with a first charge coupled device for monitoring the intensity of laser pulses and wavefront phase distortion caused by atmospheric turbulence in real time and providing reference information for clock synchronization and phase distortion compensation; the lower branch is provided for modulating pulse loading phase information and is sequentially connected with a first delayer, a second polarization beam splitter, a first deformable mirror, a first half-wave plate, a first spatial light modulator, a first intensity modulator and a second deformable mirror; the Gaussian pulse is split into the lower branch enters a first delayer, and enters a second polarization beam splitter after a certain time delay, the second polarization beam splitter reflects the Gaussian pulse to a first deformable mirror, and the first deformable mirror performs distortion compensation on a wavefront phase according to reference information provided by the upper branch; the fundamental mode Gaussian pulse after compensation is reflected to a first half-wave plate, the first half-wave plate turns the polarization state of the Gaussian pulse by 90 degrees and then enters a first spatial light modulator, and the first spatial light modulator encodes the pulse with orbital angular momentum; the coded pulses are modulated into an orbital angular momentum signal state and a decoy state with different average photon number intensities by a first intensity modulator, the orbital angular momentum signal state and the decoy state enter the second deformable mirror for phase correction, then it is transmitted from a second polarization beam splitter, and reaches a third telescope system through a first delayer, a first beam splitter and a first narrow-band filter; and finally, it is collimated by the third telescope system and sent to the measuring unit.

Preferably, the fourth telescope system of the user Bob receives the Gaussian pulse from the measuring unit, filters light outside a communication band through a second narrowband filter, and divides the incident Gaussian pulse into two paths of strong fundamental mode Gaussian pulse and weak fundamental mode Gaussian pulse through a second beam splitter, namely a strong upper branch and a weak lower branch; the upper branch is connected with a second charge coupled device provided for monitoring the intensity of laser pulses and wavefront phase distortion caused by atmospheric turbulence in real time and providing reference information for clock synchronization and phase distortion compensation; the lower branch is provided for modulating pulse loading phase information and is sequentially connected with a second delayer, a third polarization beam splitter, a third deformable mirror, a second half-wave plate, a second spatial light modulator and a second intensity modulator; the Gaussian pulse is split into the lower branch enters a second delayer, and enters a third polarization beam splitter after a certain time delay, the third polarization beam splitter reflects the Gaussian pulse to a third deformable mirror, and the third deformable mirror performs distortion compensation on a wavefront phase according to reference information provided by the upper branch; the fundamental mode Gaussian pulse after compensation is reflected to a second half-wave plate, the second half-wave plate turns the polarization state of the Gaussian pulse by 90 degrees and then enters a second spatial light modulator, and the second spatial light modulator encodes the pulse with orbital angular momentum; the coded pulses are modulated into an orbital angular momentum signal state and a decoy state with different average photon number intensities by a second intensity modulator, the orbital angular momentum signal state and the decoy state enter the fourth deformable mirror for phase correction, then it is transmitted from a third polarization beam splitter, and reaches a fourth telescope system through a second delayer, a second beam splitter and a second narrow-band filter; and finally, it is collimated by the fourth telescope system and sent to the measuring unit.

Preferably, the first charge coupled device (CCD) and the second charge coupled device (CCD) are provided for monitoring the intensity of the laser pulse and the wavefront phase distortion caused by the atmospheric turbulence in real time, and providing reference information for clock synchronization and phase distortion compensation, and the first deformable mirror, the second deformable mirror, the third deformable mirror and the fourth deformable mirror are respectively provided for performing distortion compensation on the wavefront phase according to the reference information provided by the first charge coupled device (CCD) and the second charge coupled device (CCD).

Preferably, the first deformable mirror and the third deformable mirror perform distortion compensation on the wavefront phase according to phase distortion information provided by the upper branch, and the compensated laser recovers to a state without phase distortion; the second deformable mirror and the fourth deformable mirror correct the wavefront phase according to the phase distortion information provided by the upper branch, so that the incident light generates a conjugate phase conjugated with the distortion phase, when the Gaussian pulse returns to the measuring unit through the original light path, the phase distortion caused by the environment such as atmospheric turbulence and the like is counteracted, and the Gaussian pulse recovers to the state without phase distortion.

Preferably, the first M-Z interferometer comprises a second 50/50 beam splitter, a third 50/50 beam splitter, a fifth mirror, a sixth mirror, a first dove prism and a second dove prism; the second M-Z interferometer comprises a fourth 50/50 beam splitter, a fifth 50/50 beam splitter, a seventh mirror, an eighth mirror, a third dove prism and a fourth dove prism.

Preferably, the quantum channel is a free space channel or a fiber channel.

When the measuring unit receives the signal pulses from the user Alice and the user Bob and performs interferometric measurement on the signal pulses, the first 50/50 beam splitter of the measuring unit erases photon state path information, so that photon states are indistinguishable. Due to the HOM effect, the same photon state will be output from the same output port of the first 50/50 splitter, while different photon states are output independently of each other.

Specifically, after the signal pulses are interfered by a first 50/50 beam splitter of the measuring unit, the signal pulses are output from the upper port and the lower port of the first 50/50 beam splitter, reflected by the reflector and enter a first M-Z interferometer and a second M-Z interferometer.

Taking the first M-Z interferometer as an example, the function of the first M-Z interferometer on the input photons is represented as follows:

assuming the photon state incident to the input port of the M-Z interferometer is provided as follows:

$$|\phi\rangle_{in} = |0\rangle |1\rangle$$

Wherein, $|0\rangle$ represents a vacuum state and $|1\rangle$ represents a single photon state. After passing through the second 50/50 beam splitter, the photon state becomes:

$$|\phi\rangle_{BS1} = 1/\sqrt{2}(|0\rangle|1\rangle + i|1\rangle|0\rangle)$$

the above equation shows that the probability of photons being output from the transmissive end and reflective end of the second 50/50 splitter is respectively 50%, where i represents the half-wave phase shift caused when the photons are output from the reflective end. After the photon state is acted by the Dove prism module, the phase difference $\phi = l\alpha$ generated by the two optical paths, the photon state becomes:

$$|\phi\rangle_D = 1/\sqrt{2}(|0\rangle|1\rangle + ie^{i\phi}|1\rangle|0\rangle)$$

after passing through a third 50/50 beam splitter, the photon state becomes:

$$|\phi\rangle_{BS2} = 1/2(1 - e^{i\phi})|0\rangle|1\rangle + i/2(1 + e^{i\phi})|1\rangle|0\rangle$$

Assuming $\alpha = \pi$,
when the orbital angular momentum order l is odd numbers, $|\phi\rangle_{BS2}$ becomes $|0\rangle|1\rangle$, photons are transmitted from the third 50/50 beam splitter;
when the orbital angular momentum order l is even numbers, $|\phi\rangle_{BS2}$ becomes $|1\rangle|0\rangle$, the photons become reflected from the third 50/50 beam splitter.

And finally, the states output by the M-Z interferometer are detected by a single photon detector, and a result is output in response. Specifically, the response of measuring unit is listed as follows:

| Emitted states | Possible detector response | Coded or not? |
| --- | --- | --- |
| Same states of X base | A or B responses, or both A and B response under the same interferometer | Not coded |
| Different states of X base | A or B responses, or both A and B response under the same interferometer | Not coded |
| | Both A and B response under different interferometers | Coded |
| Same states of Y base | A or B responses, or both A and B response under the same interferometer | Not coded |
| Different states of Y base | A or B responses, or both A and B response under the same interferometer | Not coded |
| | Both A and B response under different interferometers | Coded |

As shown in the list, the first single photon detector or the third single photon detector is called as "A response" when they responds, and the orbital angular momentum order l of the responding photon is an odd number; the second single photon detector or the fourth single photon detector is called as "B response" when they responds, and the orbital angular momentum order l of the responding photon is an even number; it can be seen that only "A and B response under different interferometers" can be coded. In particular, when photons from the user end Alice and the user end Bob enter the same interferometer at the same time, it may not form a single photon interference phenomenon, and thus, the orbital angular momentum order l cannot be effectively subjected to odd-even separation, which causes a random response of the detector, resulting in failure of code formation. "A and B response under different interferometers" is referred to as a successful detection event.

And finally, the user Alice and the user Bob locally generate consistent keys after the processes of base comparison, key agreement and the like according to the response condition of the measuring unit.

An OAM measurement device independent quantum key distribution method based on real-time tracking compensation, which is applied to the OAM measurement device independent quantum key distribution system based on real-time tracking compensation, comprising the following steps:

S1, monitoring signal channel environment: the measuring unit emitting fundamental mode Gaussian pulse to the user Alice and the user Bob, the user Alice and the user Bob performing clock synchronization and anti-eavesdropping monitoring by using the pulses, and meanwhile estimating the atmospheric turbulence intensity according to the dispersion degree of the light spots of the incident Gaussian pulses; executing the next step when the intensity of the atmospheric turbulence is lower than an atmospheric strength threshold value and no eavesdropping is monitored;

S2, bit encoding: the user Alice and the user Bob randomly selecting an X base or a Y base to perform information coding, randomly coding bit information into 4 orbital angular momentum states by using a spatial light modulator, and then transmitting the bit information to a middle measuring unit; wherein when the first spatial light modulator and the second spatial light modulator encode orbital angular momentum, the first spatial light modulator and the second spatial light modulator randomly select one of four states $$\{|o\rangle, |e\rangle, \frac{1}{\sqrt{2}}(|o\rangle + |e\rangle), \frac{1}{\sqrt{2}}(|o\rangle - |e\rangle)\}$$

for encoding; X base represents $\{|o\rangle, |e\rangle\}$; Y base represents $$\left\{\frac{1}{\sqrt{2}}(|o\rangle + |e\rangle), \frac{1}{\sqrt{2}}(|o\rangle - |e\rangle)\right\},$$

and $|o\rangle$ and $$\frac{1}{\sqrt{2}}(|o\rangle + |e\rangle)$$

represent bit 0; $|e\rangle$ and $$\frac{1}{\sqrt{2}}(|o\rangle + |e\rangle)$$

represent bit 1; $|o\rangle$ and $|e\rangle$ respectively represent an orbital angular momentum state of odd topological charge numbers and an orbital angular momentum state of even topological charge numbers;

S3, Bell measurement: the measuring unit performing the measuring operation, then declaring which bits being successfully detected, and simultaneously publishing the measuring result; the user Alice and the user Bob reserving the bits data successfully detected and discarding the data of other code bits;

S4, pairing base: the user Alice and the user Bob performing base pairing through a public channel, selecting bits prepared under the same base, and negotiating to perform bit inversion, thus ensuring the consistency of the bits of both communication users; after these operations are completed, the reserved data being used as the original key;

S5, error code estimation: the user Alice and the user Bob generating a final security key by using an original key obtained from the X base, the original key obtained from the Y base being used as a test bit, detecting the error rate, if the error rate is higher than an error rate threshold value, which indicates the fact that eavesdropping exists, abandoning the communication process, and otherwise, reserving the remaining data to execute the next step, the remaining data refers to the secure key data generated from original key obtained under X basis under the condition that the detecting the bit-error rate of the original secret key obtained under the Y basis which is used as a test bit is within the error rate threshold value;

S6, key agreement: the user Alice and the user Bob performing error correction and private key amplification on the screened data by using the public classical channel, and after data coordination, the user Alice and the user Bob having consistent security keys.

Preferably, when the bit encoding is performed, the user Alice and the user Bob randomly selecting the orbital angular momentum states or the superposition states of odd topology charges numbers or orbital angular momentum states or the superposition states of even topology charges numbers to perform encoding, and allowing a group of mutually unbiased bases to be formed by any odd-numbered or even-numbered orbital angular momentum states to perform encoding.

Compared with the prior art, the disclosure has the following beneficial effects:
1. the user of the OAM measurement device independent quantum key distribution system based on real-time tracking compensation utilizes the two deformable mirrors and the CCD to form the self-adaptive optical system, which can perform real-time tracking monitoring on phase distortion caused by atmospheric turbulence, estimate the degree of the atmospheric turbulence, compensate distortion phase in real time, and improve the anti-interference capability of the OAM measurement device independent quantum key distribution system.
2. In the OAM measurement device independent quantum key distribution system based on real-time tracking compensation, pulse signals of both user parties come from the same laser, the spectrum modes of the pulse signals are naturally the same, and the pulse signals have extremely high fidelity during interferometry; by using the light source, it can be conveniently to realize real-time channel monitoring, to prevent Trojan horse attack, and to conveniently perform clock synchronization.
3. The OAM measurement device independent quantum key distribution system based on real-time tracking compensation and method thereof of the present disclosure, utilizes photons with Orbital Angular Momentum (OAM) as information carriers, which can perform device independent quantum key distribution under the condition without aligning a reference system of a base, and improve the key rate; and the orbital angular momentum state has the characteristic of infinite dimensionality, so that the disclosure has extremely strong expansion capability, which may be conveniently combined with an orbital angular momentum multiplexing/separating device and improve the channel capacity.

DRAWINGS

DETAILED DESCRIPTION

The following description of the embodiments of the present disclosure will be made with reference to the accompanying drawings.

Figure 1:
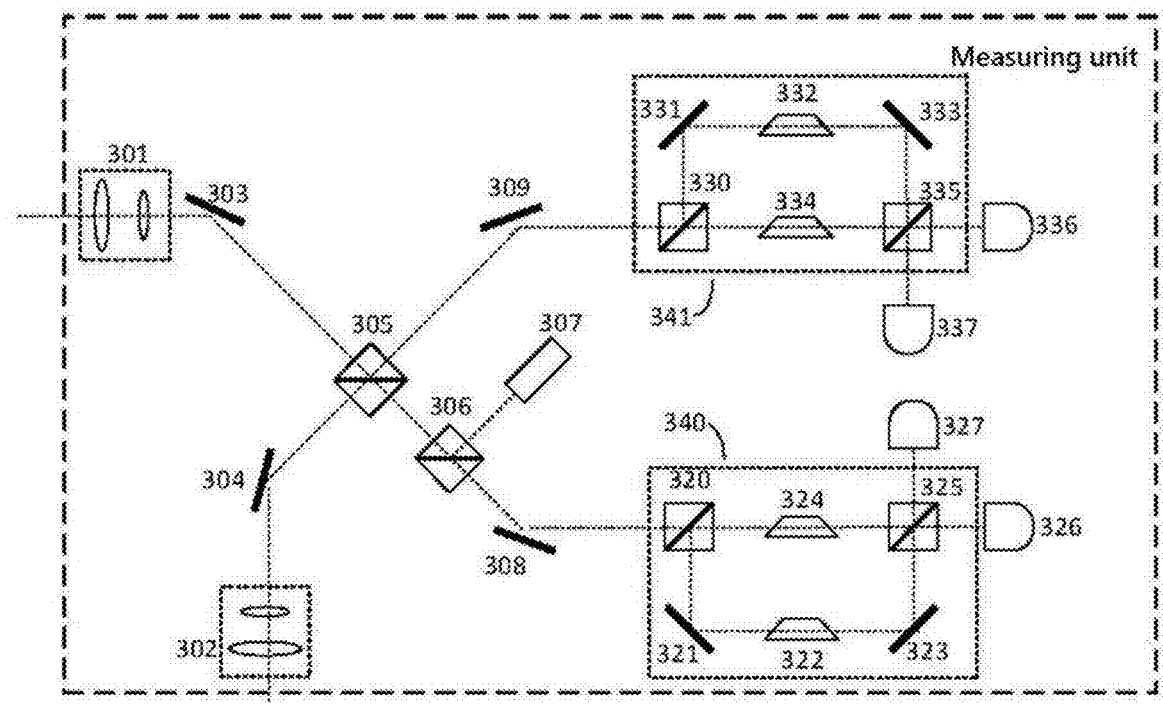
FIG. 1 is a structure diagram of a measuring unit according to the present disclosure.
Figure 2:
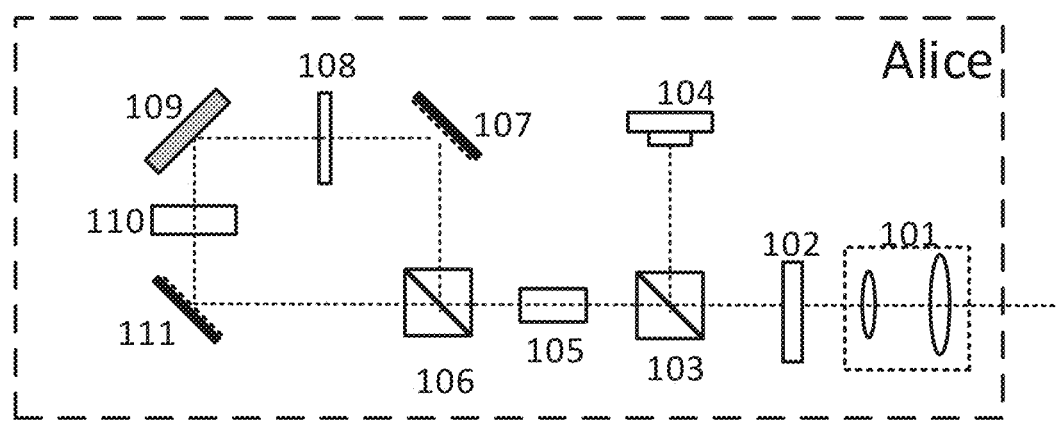
FIG. 2 is a structure diagram of a user Alice according to the present disclosure.
Figure 3:
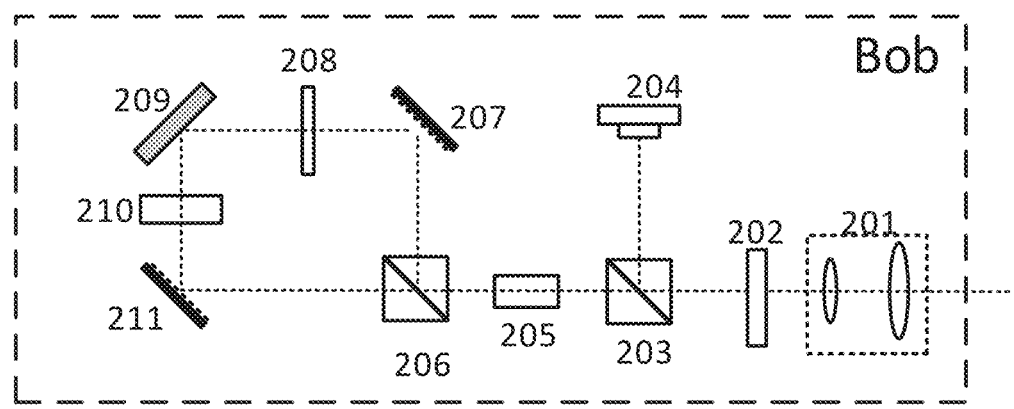
FIG. 3 is a structure diagram of a user Bob according to the present disclosure.

As shown in FIGS. 1 to 3, an OAM measurement device independent quantum key distribution system based on real-time tracking compensation comprises: a user Alice, a user Bob and a measuring unit.

The user Alice and the user Bob are connected with the measuring unit through quantum channels, wherein:

the quantum channel is a free space channel or an optical fiber channel, and the embodiment takes the free space channel as an example for explanation.

The measuring unit generates Gaussian pulses by using a pulse laser device, the Gaussian pulses are transmitted to a user through a polarization beam splitter and a beam splitter, the user utilizes a charge coupled device (CCD) and a beam splitter for monitoring and synchronization, performs phase distortion compensation through a deformable mirror, and utilizes an intensity modulator and a spatial light modulator to randomly generate decoy state photons and signal state photons of orbital angular momentum with the number of the photons less than 1, and sends the photons to a middle measuring unit. The measuring unit measures the photon state emitted by the user with time multiplexed single photon detector. The measuring unit measures the photon state sent by the user and publishes the measuring result, and the user locally generates a consistent key after the processes of base comparison, key agreement and the like according to the response condition of the measurement.

As shown in FIG. 1, the measuring unit comprises: a first telescope system 301, a second telescope system 302, a first 50/50 beam splitter 305, a second 50/50 beam splitter 320, a third 50/50 beam splitter 325, a fourth 50/50 beam splitter 330, a fifth 50/50 beam splitter 335, a first polarization beam splitter 306, a pulse laser device 307, a first reflector 303, a second reflector 304, a third reflector 308, a fourth reflector 309, a first M-Z interferometer, a second M-Z interferometer, a first single photon detector 326, a second single photon detector 327, a third single photon detector 336, and a fourth single photon detector 337. The first telescope system 301 and the second telescope system 302 are mainly provided for collimating laser pulses; the first polarization beam splitter 306 transmits horizontally polarized light and reflects vertically polarized light; the pulse laser device 307 is used as a pump light source for pumping to generate fundamental mode gaussian light; the first M-Z interferometer 340 comprises a second 50/50 beam splitter 320, a third 50/50 beam splitter 325, a fifth reflector 321, a sixth reflector 323, a first dove prism 324 and a second dove prism 322; the second M-Z interferometer 341 comprises a fourth 50/50 beam splitter 330, a fifth 50/50 beam splitter 335, a seventh reflector 331, an eighth reflector 333, a third dove prism 332 and a fourth dove prism 334; the first M-Z interferometer 340 and second M-Z interferometers 341 are configured to separate photons of orbital angular momentum order l as odd numbers and of orbital angular momentum order l as even numbers. Taking the first M-Z interferometer 340 as an example, when the relative angle between the first dove prism 324 and the second dove prism 322 in the two optical paths of the first M-Z interferometer 340 is provided as "α/2", the function of the first dove prism 324 and the second dove prism 322 is equivalent to adding a beam rotator with a rotation angle "α" to one of the optical paths, so that photons with orbital angular momentum l generate a phase difference $\phi=l\alpha$ in the two optical paths of the interferometer; the first single photon detector 326, the second single photon detector 327, the third single photon detector 336 and the fourth single photon detector 337 are configured to detect optical signals of a single photon magnitude;

as shown in FIG. 2, the user Alice comprises: a third telescope system 101, a first narrow band filter 102, a first beam splitter 103, a first charge coupled device (CCD) 104, a first delayer 105, a second polarizing beam splitter 106, a first deformable mirror 107, a second deformable mirror 111, a first half-wave plate 108, a first spatial light modulator 109 and a first intensity modulator 110.

As shown in FIG. 3, the user Bob comprises: a fourth telescope system 201, a second narrow band filter 202, a second beam splitter 203, a second charge coupled device (CCD) 204, a second delayer 205, a third polarizing beam splitter 206, a third deformable mirror 207, a fourth deformable mirror 211, a second half-wave plate 208, a second spatial light modulator 209, and a second intensity modulator 210.

The third telescope system 101 and the fourth telescope system 201 each comprise two confocal convex lenses for controlling the size of the laser pulse and the far-field divergence angle of the Gaussian pulse; the first narrow-band filter 102 and the second narrow-band filter 202 are provided for filtering light out of a communication waveband; the first beam splitter 103 and the second beam splitter 203 divide incident Gaussian pulse into two paths of strong fundamental mode Gaussian pulse and weak pulser laser, namely a strong upper branch and a weak lower branch; the first charge coupled device (CCD) 104 and the second Charge coupled device (CCD) 204 are provided for monitoring the intensity of laser pulses and wavefront phase distortion caused by atmospheric turbulence in real time and providing reference information for clock synchronization and phase distortion compensation of the lower branch; the second polarization beam splitter 106 and the third polarization beam splitter 206 transmit the horizontal polarization light and reflect the vertical polarization light; the first deformable mirror 107, the second deformable mirror 111, the third deformable mirror 207 and the fourth deformable mirror 211 are also called wavefront correctors, which may change the optical path of the wave front transmission or change the refractive index of a transmission medium to change the phase structure of the wave front of the incident light according to the reference information of phase distortion, so as to achieve the purpose of compensating the wave phase of the light wave; the principal sections of the first half-wave plate 108 and the second half-wave plate 208 are provided at an angle of 45 degrees with the polarization surface of incident light, and the polarization direction of the incident light may be rotated by 90 degrees; the first spatial light modulator 109 and the second spatial light modulator 209 are phase-only reflective liquid crystal spatial light modulators, which are active digital optical devices based on liquid crystal molecule electro-birefringence effect, and provided for modulating orbital angular momentum of Gaussian pulses; the first intensity modulator 110 and the second intensity modulator 210 may accurately generate the decoy state photons and the signal state photons with different average photon number intensities.

Figure 4:
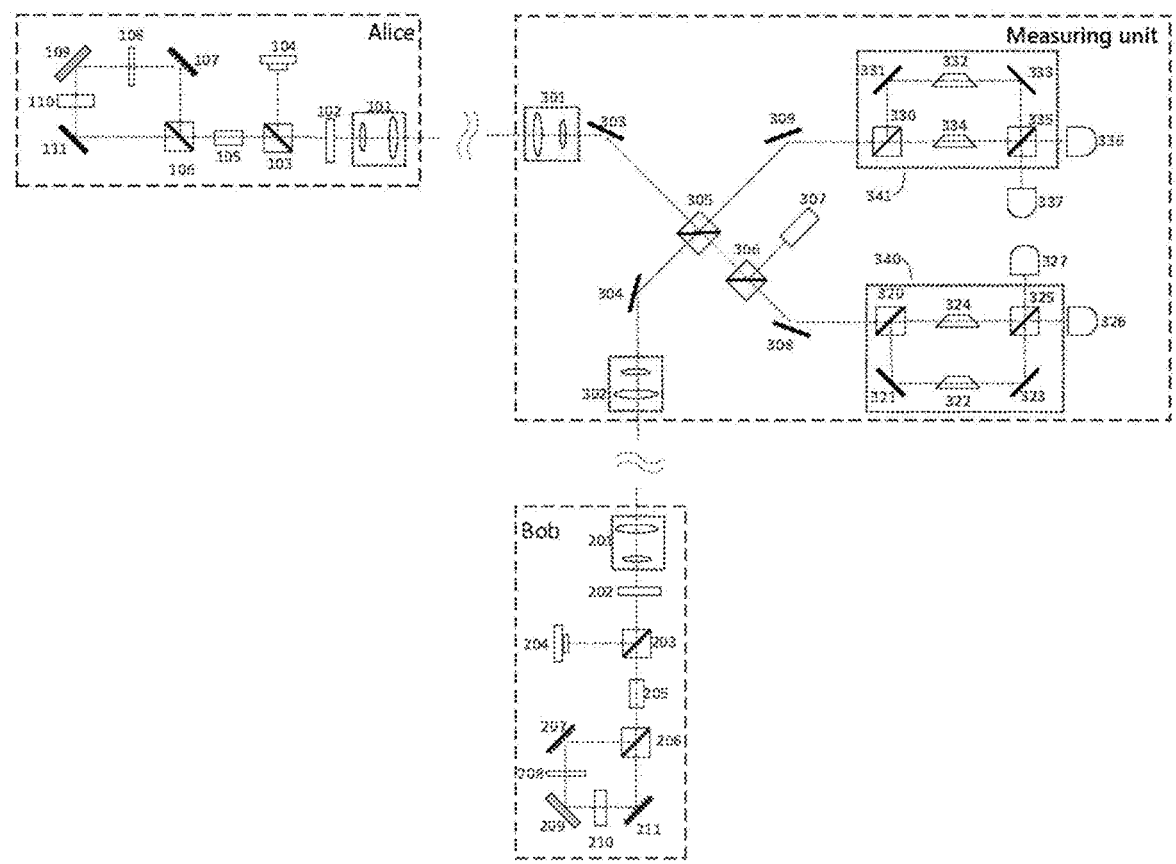
FIG. 4 is a schematic diagram of the system operation of the present disclosure.

As shown in FIG. 4, during quantum communication, when a pulse laser device 307 of the measuring unit emits a fundamental mode Gaussian pulse, the fundamental mode Gaussian pulse with the polarization mode of vertical polarization is reflected to a first 50/50 beam splitter 305 and split into 2 beams through screening of a first polarization beam splitter 306, and afterwards is collimated by a first telescope system 301 and a second telescope system 302 and is finally respectively transmitted to the user Alice and the user Bob through quantum channels;

as shown in FIG. 2, the third telescope system 101 of the user Alice receives the Gaussian pulse from the measuring unit, then filters light out of a communication band through the first narrow band filter 102, and divides the incident pulse laser into two paths of strong fundamental mode Gaussian pulse and weak pulser laser through the first beam splitter 103, namely a strong upper branch and a weak lower branch; the upper branch is connected with a first charge coupled device (CCD) 104 for monitoring the intensity of laser pulses and wavefront phase distortion caused by atmospheric turbulence in real time and providing reference information for clock synchronization and phase distortion compensation; the lower branch is provided for modulating pulse loading phase information and is sequentially connected with a first delayer 105, a second polarization beam splitter 106, a first deformable mirror 107, a first half-wave plate 108, a first spatial light modulator 109, a first intensity modulator 110 and a second deformable mirror 111; the Gaussian pulse is split into the lower branch enters a first delayer 105, and enters a second polarization beam splitter 106 after a certain time delay, the second polarization beam splitter 106 reflects the Gaussian pulse to a first deformable mirror 107, and the first deformable mirror 107 performs distortion compensation on a wavefront phase according to reference information provided by the upper branch; the fundamental mode Gaussian pulse after compensation is reflected to a first half-wave plate 108, the first half-wave plate 108 turns the polarization state of the Gaussian pulse by 90 degrees and then enters a first spatial light modulator 109, and the first spatial light modulator 109 encodes the pulse with orbital angular momentum; the coded pulses are modulated into an orbital angular momentum signal state and a decoy state with different average photon number intensities by a first intensity modulator 110, the orbital angular momentum signal state and the decoy state enter the second deformable mirror 111 for phase correction, then it is transmitted from a second polarization beam splitter 106, and reaches a third telescope system through a first delayer 105, a first beam splitter 103 and a first narrow-band filter 102; and finally, it is collimated by the third telescope system 101 and sent to the measuring unit.

As shown in FIG. 3, the fourth telescope system 201 of the user Bob receives the Gaussian pulse from the measuring unit, filters light outside a communication band through a second narrowband filter 202, and divides the incident Gaussian pulse into two paths of strong fundamental mode Gaussian pulse and weak fundamental mode Gaussian pulse through a second beam splitter 203, namely a strong upper branch and a weak lower branch; the upper branch is connected with a second charge coupled device (CCD) 204 for monitoring the intensity of laser pulses and wavefront phase distortion caused by atmospheric turbulence in real time and providing reference information for clock synchronization and phase distortion compensation; the lower branch is provided for modulating pulse loading phase information and is sequentially connected with a second delayer 205, a third polarization beam splitter 206, a third deformable mirror 207, a second half-wave plate 208, a second spatial light modulator 209, a second intensity modulator 210 and the fourth deformable mirror 211; the Gaussian pulse is split into the lower branch enters a second delayer 205, and enters a third polarization beam splitter 206 after a certain time delay, the third polarization beam splitter 206 reflects the Gaussian pulse to a third deformable mirror 207, and the third deformable mirror 207 performs distortion compensation on a wavefront phase according to reference information provided by the upper branch; the compensated Gaussian pulse is reflected to a second half-wave plate 208, the second half-wave plate 208 turns the polarization state of the Gaussian pulse by 90 degrees and then enters a second spatial light modulator 209, and the second spatial light modulator 209 encodes the pulse with orbital angular momentum; the coded pulses are modulated into an orbital angular momentum signal state and a decoy state with different average photon number intensities by a second intensity modulator 210, the orbital angular momentum signal state and the decoy state enter the fourth deformable mirror 211 for phase correction, then it is transmitted from a third polarization beam splitter 206, and reaches a fourth telescope system 201 through a second delayer 205, a second beam splitter 203 and a second narrow-band filter 202; and finally, it is collimated by the fourth telescope system 201 and sent to the measuring unit.

when the first spatial light modulator 109 and the second spatial light modulator 209 encode orbital angular momentum, the first spatial light modulator 109 and the second spatial light modulator 209 may randomly select one of four states $$\{|o\rangle, |e\rangle, \frac{1}{\sqrt{2}}(|o\rangle + |e\rangle), \frac{1}{\sqrt{2}}(|o\rangle - |e\rangle)\}$$

for encoding; wherein $\{|o\rangle, |e\rangle\}$ is X base;

$$\left\{\frac{1}{\sqrt{2}}(|o\rangle + |e\rangle), \frac{1}{\sqrt{2}}(|o\rangle - |e\rangle)\right\}$$

is Y base, and $|o\rangle$ and $$\frac{1}{\sqrt{2}}(|o\rangle + |e\rangle)$$

represents bit 0; and $|e\rangle$ and $$\frac{1}{\sqrt{2}}(|o\rangle - |e\rangle)$$

represents bit 1; and $|o\rangle$ and $|e\rangle$ respectively represent orbital angular momentum states of odd topological charge numbers and orbital angular momentum states of even topological charge numbers.

The first telescope system 301 and the second telescope system 302 of the measuring unit respectively receive signal pulses from the user Alice and the user Bob, the signal pulses firstly intervene at the first 50/50 splitter 305 after reflecting by the first reflector 303 and the second reflector 304. the first 50/50 beam splitter 305 erases photon state path information, so that photon states are indistinguishable. Due to the HOM effect, the same photon state will be output from the same output port of the first 50/50 splitter 305, while different photon states are output independently of each other.

The signal pulses are output from the upper port and the lower port of the first 50/50 beam splitter 305, reflected by the third reflector 308 and the fourth reflector 309, and enter a first M-Z interferometer 340 and a second M-Z interferometer 341. Taking the first M-Z interferometer 340 as an example, the function of the first M-Z interferometer on the input photons is represented as follows:

assuming the photon state incident to the input port of the M-Z interferometer is provided as follows:

$$|\phi\rangle_{in} = |0\rangle|1\rangle$$

Wherein, $|0\rangle$ represents a vacuum state and $|1\rangle$ represents a single photon state. After passing through the second 50/50 beam splitter 320, the photon state becomes:

$$|\phi\rangle_{BS1} = 1/\sqrt{2}(|0\rangle|1\rangle + i|1\rangle|0\rangle)$$

the above equation shows that the probability of photons being output from the transmissive end and reflective end of the second 50/50 splitter 320 is respectively 50%, where i represents the half-wave phase shift caused when the photons are output from the reflective end. After the photon state is acted by the first Dove prism 322, the second Dove prism 324, the phase difference $\phi = l\alpha$ generated by the two optical paths, the photon state becomes:

$$|\phi\rangle_D = 1/\sqrt{2}(|0\rangle|1\rangle + ie^{i\phi}|1\rangle|0\rangle)$$

after passing through a third 50/50 beam splitter 325, the photon state becomes:

$$|\phi\rangle_{BS2} = 1/2(1 - e^{i\phi})|0\rangle|1\rangle + i/2(1 + e^{i\phi})|1\rangle|0\rangle$$

Assuming $\alpha = \pi$, when the orbital angular momentum order l is odd numbers, $|\phi\rangle_{BS2}$ becomes $|0\rangle|1\rangle$, photons are transmitted from the third 50/50 beam splitter 325;

when the orbital angular momentum order l is even numbers, $|\phi\rangle_{BS2}$ becomes $|1\rangle|0\rangle$, the photons become reflected from the third 50/50 beam splitter 325.

And finally, the states output by the M-Z interferometer are detected by a single photon detector, and a result is output in response. Specifically, the response of measuring unit is listed as follows:

| Emitted states | Possible detector response | Coded or not? |
|---|---|---|
| Same states of X base | A or B responses, or both A and B response under the same interferometer | Not coded |
| Different states of X base | A or B responses, or both A and B response under the same interferometer | Not coded |
| | Both A and B response under different interferometers | Coded |
| Same states of Y base | A or B responses, or both A and B response under the same interferometer | Not coded |
| Different states of Y base | A or B responses, or both A and B response under the same interferometer | Not coded |
| | Both A and B response under different interferometers | Coded |

As shown in the list, the first single photon detector or the third single photon detector is called as "A response" when they responds, and the orbital angular momentum order l of the responding photon is an odd number; the second single photon detector or the fourth single photon detector is called as "B response" when they responds, and the orbital angular momentum order l of the responding photon is an even number; it can be seen that only "A and B response under different interferometers" can be coded. In particular, when photons from the user end Alice and the user end Bob enter the same interferometer at the same time, it may not form a single photon interference phenomenon, and thus, the orbital angular momentum order l cannot be effectively subjected to odd-even separation, which causes a random response of the detector, resulting in failure of code formation. "A and B response under different interferometers" is referred to as a successful detection event.

And finally, the user Alice and the user Bob locally generate consistent keys after the processes of base comparison, key agreement and the like according to the response condition of the measuring unit.

Figure 5:
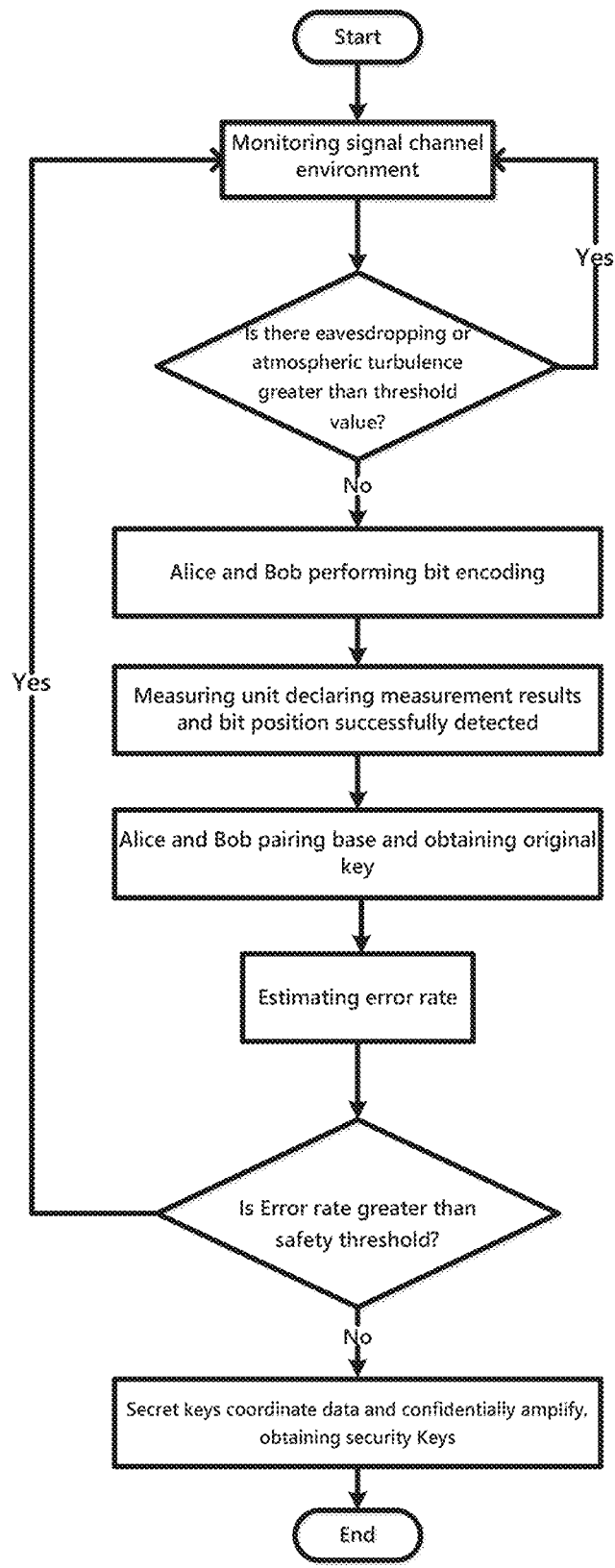
FIG. 5 is a flow chart of the system operation of the present disclosure.

As shown in FIG. 5, an OAM measurement device independent quantum key distribution method based on real-time tracking compensation, which is applied to the OAM measurement device independent quantum key distribution system based on real-time tracking compensation as described above, comprises the following steps:

S1, monitoring signal channel environment: the measuring unit emitting fundamental mode Gaussian pulse to the user Alice and the user Bob, the user Alice and the user Bob performing clock synchronization and anti-eavesdropping monitoring by using the pulses, and meanwhile estimating the atmospheric turbulence intensity according to the dispersion degree of the light spots of the incident Gaussian pulses; executing the next step when the intensity of the atmospheric turbulence is lower than the atmospheric strength threshold value and no eavesdropping is monitored;

S2, bit encoding: the user Alice and the user Bob randomly selecting an X base or a Y base to perform information coding, randomly coding bit information into 4 orbital angular momentum states by using a spatial light modulator, and then transmitting the bit information to a middle measuring unit; wherein when the first spatial light modulator and the second spatial light modulator encode orbital angular momentum, the first spatial light modulator and the second spatial light modulator randomly select one of four states $$\{|o\rangle, |e\rangle, \frac{1}{\sqrt{2}}(|o\rangle+|e\rangle), \frac{1}{\sqrt{2}}(|o\rangle-|e\rangle)\}$$

for encoding; X base represents $\{|o\rangle, |e\rangle\}$; Y base represents $$\left\{\frac{1}{\sqrt{2}}(|o\rangle+|e\rangle), \frac{1}{\sqrt{2}}(|o\rangle-|e\rangle)\right\},$$

and $|o\rangle$ and $$\frac{1}{\sqrt{2}}(|o\rangle+|e\rangle)$$

represent bit 0; $|e\rangle$ and $$\frac{1}{\sqrt{2}}(|o\rangle+|e\rangle)$$

represent bit 1; $|o\rangle$ and $|e\rangle$ respectively represent an orbital angular momentum state of odd topological charge numbers and an orbital angular momentum state of even topological charge numbers; when the bit encoding is performed, the user Alice and the user Bob randomly selecting the orbital angular momentum states or the superposition states of odd topology charges numbers or orbital angular momentum states or the superposition states of even topology charges numbers to perform encoding, and allowing a group of mutually unbiased bases to be formed by any odd-numbered or even-numbered orbital angular momentum states to perform encoding;

S3, Bell measurement: the measuring unit performing the measuring operation, then declaring which bits being successfully detected, and simultaneously publishing the measuring result; the user Alice and the user Bob reserving the bits data successfully detected and discarding the data of other code bits;

S4, pairing base: the user Alice and the user Bob performing base pairing through a public channel, selecting bits prepared under the same base, and negotiating to perform bit inversion, thus ensuring the consistency of the bits of both communication users; after these operations are completed, the reserved data being used as the original key;

S5, error code estimation: the user Alice and the user Bob generating a final security key by using an original key obtained from the X base, the original key obtained from the Y base being used as a test bit, detecting the error rate, if the error rate is higher than the error rate threshold value, which indicates the fact that eavesdropping exists, abandoning the communication process, and otherwise, reserving the remaining data to execute the next step, the remaining data refers to the secure key data generated from original key obtained under X basis under the condition that the detecting the bit-error rate of the original secret key obtained under the Y basis which is used as a test bit is within the error rate threshold value;

S6, key agreement: the user Alice and the user Bob performing error correction and private key amplification on the screened data by using the public classical channel, and after data coordination, the user Alice and the user Bob having consistent security keys.

The above description is only an embodiment of the present disclosure, but the scope of the present disclosure is not limited thereto, and any changes or substitutions within the technical scope disclosed in the present disclosure should be covered within the scope of the present disclosure. Therefore, the scope of the present disclosure should be determined by the revelation and teaching of the above specification, and the modifications and variations of the above embodiments can be made by those skilled in the art to which the present disclosure pertains. Therefore, the present disclosure is not limited to the specific embodiments disclosed and described above, and modifications and variations of the present disclosure are also intended to fall within the scope of the appended claims. Furthermore, although specific terms are used herein, they are used in a generic and descriptive sense only and not for purposes of limitation.

What is claimed is:

1. An OAM measurement device independent quantum key distribution system based on real-time tracking compensation, wherein, comprising: a user Alice, a user Bob and a measuring unit;
   the user Alice and the user Bob are connected with the measuring unit through quantum channels:
   the measuring unit comprising: a first telescope system, a second telescope system, a first 50/50 beam splitter, a first polarization beam splitter, a pulse laser device, a first reflector, a second reflector, a third reflector, a fourth reflector, a first M-Z interferometer, a second M-Z interferometer and a first single photon detector, a second single photon detector, a third single photon detector, a fourth single photon detector;
   the measuring unit is configured to generate and process a fundamental mode Gaussian pulse as the following operations: when the pulse laser device of the measuring unit emits a fundamental mode Gaussian pulse, the fundamental mode Gaussian pulse with the polarization mode of vertical polarization is reflected to the first 50/50 beam splitter and split into 2 beams through screening of the first polarization beam splitter, and then is respectively reflected by the first reflector and the second reflector, and afterwards is collimated by the first telescope system and the second telescope system and is finally respectively transmitted to the user Alice and the user Bob through quantum channels;
   the user Alice comprising:
   a third telescope system configured to receive the fundamental mode Gaussian pulse from the measuring unit;
   a first narrow band filter configured to filter the fundamental mode Gaussian pulse from the third telescope system;
   a first beam splitter configured to split the fundamental mode Gaussian pulse from the first narrow band filter into a plurality of strong branches and weak branches;
   a first charge coupled device connected with one strong branch of the fundamental mode Gaussian pulses to monitor the intensity of fundamental mode Gaussian pulses and wavefront phase distortion caused by atmospheric turbulence in real time;
   a first delayer configured to receive and perform time delay on one weak branch of the fundamental mode Gaussian pulses;
   a second polarization beam splitter configured to reflect the fundamental mode Gaussian pulse from the first delayer;
   a first deformable mirror configured to perform distortion compensation on a wavefront phase according to reference information and reflecting the fundamental mode Gaussian pulse;
   a first half-wave plate configured to turn the polarization state of the fundamental mode Gaussian pulse by a certain degree;
   a first spatial light modulator configured to encode the fundamental mode Gaussian pulse with orbital angular momentum;
   a first intensity modulator configured to modulate the encoded fundamental mode Gaussian pulses into the decoy state and the signal state with different average photon number intensities; and
   a second deformable mirror configured to perform phase correction on the orbital angular momentum signal state and the decoy state;
   the user Bob comprising:
   a fourth telescope system configured to receive the fundamental mode Gaussian pulse from the measuring unit;
   a second narrow band filter configured to filter the fundamental mode Gaussian pulse from the fourth telescope system;
   a second beam splitter configured to split the fundamental mode Gaussian pulse from the second narrow band filter into a plurality of strong branches and weak branches;
   a second charge coupled device connected with one strong branch of the fundamental mode Gaussian pulses to monitor the intensity of fundamental mode Gaussian pulses and wavefront phase distortion caused by atmospheric turbulence in real time;
   a second delayer configured to receive and perform time delay for one weak branch of the fundamental mode Gaussian pulses;
   a third polarization beam splitter configured to reflect the fundamental mode Gaussian pulse from the second delayer;
   a third deformable mirror configured to perform distortion compensation on a wavefront phase according to reference information and reflecting the fundamental mode Gaussian pulse;
   a third half-wave plate configured to turn the polarization state of the fundamental mode Gaussian pulse by a certain degree;
   a second spatial light modulator configured to encode the fundamental mode Gaussian pulse with orbital angular momentum;
   a second intensity modulator configured to modulate the encoded fundamental mode Gaussian pulses into the decoy state and the signal state with different average photon number intensities; and
   a fourth deformable mirror configured to perform phase correction on the orbital angular momentum signal state and the decoy state;
   the user Alice and the user Bob is configured to respectively perform channel environment real-time monitoring, phase distortion compensation and orbital angular momentum encoding on the fundamental mode Gaussian pulse from the measuring unit and then send the fundamental mode Gaussian pulse to the measuring unit;

when the first telescope system and the second telescope system of the measuring unit respectively receive signal pulses from the user Alice and the user Bob, the fundamental mode Gaussian pulse is reflected by the first reflector and the second reflector, then is interfered at the first 50/50 beam splitter, the interfered fundamental mode Gaussian pulses respectively enter the first M-Z interferometer and the second M-Z interferometer after being respectively reflected by the third reflector and the fourth reflector; and then the fundamental mode Gaussian pulses enter the first single photon detector, the second single photon detector, the third single photon detector and the fourth single photon detector to cause response and output measuring results after being separated by the first M-Z interferometer and the second M-Z interferometer; and the user Alice and the user Bob locally generates consistent keys after the processes of base comparison and key agreement according to the measured response condition.

2. The OAM measurement device independent quantum key distribution system based on real-time tracking compensation according to claim 1, wherein, the first charge coupled device and the second charge coupled device are provided for monitoring the intensity of the fundamental mode Gaussian pulse and the wavefront phase distortion caused by the atmospheric turbulence in real time, and providing reference information for clock synchronization and phase distortion compensation, and the first deformable mirror, the second deformable mirror, the third deformable mirror and the fourth deformable mirror are respectively provided for performing distortion compensation on the wavefront phase according to the reference information provided by the first charge coupled device and the second charge coupled device.

3. An OAM measurement device independent quantum key distribution method based on real-time tracking compensation, wherein the method is applied to the system according to claim 2, wherein, the method comprising the following steps:

S1, monitoring signal channel environment: the measuring unit emitting fundamental mode Gaussian pulse to the user Alice and the user Bob, the user Alice and the user Bob performing clock synchronization and anti-eavesdropping monitoring by using the pulses, and meanwhile estimating the atmospheric turbulence intensity according to the dispersion degree of the light spots of the incident Gaussian pulses; executing the next step when the intensity of the atmospheric turbulence is lower than the atmospheric strength threshold value and no eavesdropping is monitored;

S2, bit encoding: the user Alice and the user Bob randomly selecting an X base or a Y base to perform information coding, randomly coding bit information into 4 orbital angular momentum states by using a spatial light modulator, and then transmitting the bit information to a middle measuring unit; wherein when the first spatial light modulator and the second spatial light modulator encode orbital angular momentum, the first spatial light modulator and the second spatial light modulator randomly select one of four states $$\{|o\rangle, |e\rangle, \frac{1}{\sqrt{2}}(|o\rangle + |e\rangle), \frac{1}{\sqrt{2}}(|o\rangle - |e\rangle)\}$$

for encoding; X base represents $\{|o\rangle, |e\rangle\}$; Y base represents $$\left\{\frac{1}{\sqrt{2}}(|o\rangle + |e\rangle), \frac{1}{\sqrt{2}}(|o\rangle - |e\rangle)\right\},$$

and $|o\rangle$ and $$\frac{1}{\sqrt{2}}(|o\rangle + |e\rangle)$$

represent bit 0; $|e\rangle$ and $$\frac{1}{\sqrt{2}}(|o\rangle + |e\rangle)$$

represent bit 1; $=o\rangle$ and $|e\rangle$ respectively represent an orbital angular momentum state of odd topological charge numbers and an orbital angular momentum state of even topological charge numbers;

S3, Bell measurement: the measuring unit performing the measuring operation, then declaring which bits being successfully detected, and simultaneously publishing the measuring result; the user Alice and the user Bob reserving the bits data successfully detected and discarding the data of other code bits;

S4, pairing base: the user Alice and the user Bob performing base pairing through a public channel, selecting bits prepared under the same base, negotiating to perform bit inversion, and ensuring the consistency of the bits of both communication users; after these operations are completed, the reserved data being used as the original key;

S5, error code estimation: the user Alice and the user Bob generating a final security key by using an original key obtained from the X base, the original key obtained from the Y base being used as a test bit, detecting the error rate, if the error rate is higher than an error rate threshold value, which indicates the fact that eavesdropping exists, abandoning the communication process, and otherwise, reserving the remaining data to execute the next step, the remaining data refers to the secure key data generated from original key obtained under X basis under the condition that the detecting the bit-error rate of the original secret key obtained under the Y basis which is used as a test bit is within the error rate threshold value;

S6, key agreement: the user Alice and the user Bob performing error correction and private key amplification on the screened data by using the public classical channel, and after data coordination, the user Alice and the user Bob having consistent security keys.

4. The OAM measurement device independent quantum key distribution method based on real-time tracking compensation according to claim 3, wherein, when the bit encoding is performed, the user Alice and the user Bob randomly selecting the orbital angular momentum states or the superposition states of odd topology charges numbers or orbital angular momentum states or the superposition states of even topology charges numbers to perform encoding, and allowing a group of mutually unbiased bases to be formed by any odd-numbered or even-numbered orbital angular momentum states to perform encoding.

5. The OAM measurement device independent quantum key distribution system based on real-time tracking compensation according to claim 1, wherein, the first spatial light modulator, the second spatial light modulator and the first intensity modulator, the second intensity modulator randomly modulates fundamental mode Gaussian pulses by implementing the following operations;

when the first spatial light modulator and the second spatial light modulator encode orbital angular momentum, the first spatial light modulator and the second spatial light modulator randomly selects one of four states $$\{|o\rangle, |e\rangle, \frac{1}{\sqrt{2}}(|o\rangle + |e\rangle), \frac{1}{\sqrt{2}}(|o\rangle - |e\rangle)\}$$

for encoding; wherein $\{|o\rangle, |e\rangle\}$ is X base;

$$\left\{\frac{1}{\sqrt{2}}(|o\rangle + |e\rangle), \frac{1}{\sqrt{2}}(|o\rangle - |e\rangle)\right\}$$

is Y base, and $|o\rangle$ and $$\frac{1}{\sqrt{2}}(|o\rangle + |e\rangle)$$

represents bit 0; and $|e\rangle$ and $$\frac{1}{\sqrt{2}}(|o\rangle + |e\rangle)$$

represents bit 1; and $|o\rangle$ and $|e\rangle$ respectively represent orbital angular momentum states of odd topological charge numbers and orbital angular momentum states of even topological charge numbers; the first intensity modulator and the second intensity modulator accurately generates the photons in the decoy state and the signal state with different average photon number intensities.

6. An OAM measurement device independent quantum key distribution method based on real-time tracking compensation, wherein the method is applied to the system according to claim 5, wherein, the method comprising the following steps:

S1, monitoring signal channel environment: the measuring unit emitting fundamental mode Gaussian pulse to the user Alice and the user Bob, the user Alice and the user Bob performing clock synchronization and anti-eavesdropping monitoring by using the pulses, and meanwhile estimating the atmospheric turbulence intensity according to the dispersion degree of the light spots of the incident Gaussian pulses; executing the next step when the intensity of the atmospheric turbulence is lower than the atmospheric strength threshold value and no eavesdropping is monitored;

S2, bit encoding: the user Alice and the user Bob randomly selecting an X base or a Y base to perform information coding, randomly coding bit information into 4 orbital angular momentum states by using a spatial light modulator, and then transmitting the bit information to a middle measuring unit; wherein when the first spatial light modulator and the second spatial light modulator encode orbital angular momentum, the first spatial light modulator and the second spatial light modulator randomly select one of four states $$\{|o\rangle, |e\rangle, \frac{1}{\sqrt{2}}(|o\rangle + |e\rangle), \frac{1}{\sqrt{2}}(|o\rangle - |e\rangle)\}$$

for encoding; X base represents $\{|o\rangle, |e\rangle\}$; Y base represents $$\left\{\frac{1}{\sqrt{2}}(|o\rangle + |e\rangle), \frac{1}{\sqrt{2}}(|o\rangle - |e\rangle)\right\},$$

and $|o\rangle$ and $$\frac{1}{\sqrt{2}}(|o\rangle + |e\rangle)$$

represent bit 0, $|e\rangle$ and $$\frac{1}{\sqrt{2}}(|o\rangle + |e\rangle)$$

represent bit 1; $|0\rangle$ and $|e\rangle$ respectively represent an orbital angular momentum state of odd topological charge numbers and an orbital angular momentum state of even topological charge numbers;

S3, Bell measurement: the measuring unit performing the measuring operation, then declaring which bits being successfully detected, and simultaneously publishing the measuring result; the user Alice and the user Bob reserving the bits data successfully detected and discarding the data of other code bits;

S4, pairing base: the user Alice and the user Bob performing base pairing through a public channel, selecting bits prepared under the same base, negotiating to perform bit inversion, and ensuring the consistency of the bits of both communication users; after these operations are completed, the reserved data being used as the original key;

S5, error code estimation: the user Alice and the user Bob generating a final security key by using an original key obtained from the X base, the original key obtained from the Y base being used as a test bit, detecting the error rate, if the error rate is higher than the error rate threshold value, which indicates the fact that eavesdropping exists, abandoning the communication process, and otherwise, reserving the remaining data to execute the next step, the remaining data refers to the secure key data generated from original key obtained under X basis under the condition that the detecting the bit-error rate of the original secret key obtained under the Y basis which is used as a test bit is within the error rate threshold value;

S6, key agreement: the user Alice and the user Bob performing error correction and private key amplification on the screened data by using the public classical channel, and after data coordination, the user Alice and the user Bob having consistent security keys.

7. The OAM measurement device independent quantum key distribution method based on real-time tracking compensation according to claim 6, wherein, when the bit encoding is performed, the user Alice and the user Bob randomly selecting the orbital angular momentum states or the superposition states of odd topology charges numbers or orbital angular momentum states or the superposition states of even topology charges numbers to perform encoding, and allowing a group of mutually unbiased bases to be formed by any odd-numbered or even-numbered orbital angular momentum states to perform encoding.

8. The OAM measurement device independent quantum key distribution system based on real-time tracking compensation according to claim 1, wherein, the third telescope system of the user Alice receives the fundamental mode Gaussian pulse from the measuring unit, then filters light out of a communication band through the first narrow band filter, and divides the incident fundamental mode Gaussian pulse into two paths of strong fundamental mode Gaussian pulse and weak fundamental mode Gaussian pulse through the first beam splitter, namely a strong upper branch and a weak lower branch; the upper branch is connected with the first charge coupled device for monitoring the intensity of laser pulses and wavefront phase distortion caused by atmospheric turbulence in real time and providing reference information for clock synchronization and phase distortion compensation; the lower branch is provided for modulating pulse loading phase information and is sequentially connected with the first delayer, the second polarization beam splitter, the first deformable mirror, the first half-wave plate, the first spatial light modulator, the first intensity modulator and the second deformable mirror; the fundamental mode Gaussian pulse is split into the lower branch entering the first delayer, and then enters the second polarization beam splitter after a certain time delay, the second polarization beam splitter reflects the fundamental mode Gaussian pulse to a first deformable mirror, and the first deformable mirror performs distortion compensation on a wavefront phase according to reference information provided by the upper branch; the fundamental mode Gaussian pulse after compensation is reflected to a first half-wave plate, the first half-wave plate turns the polarization state of the fundamental mode Gaussian pulse by 90 degrees and then enters the first spatial light modulator, and the first spatial light modulator encodes the pulse with orbital angular momentum; the coded pulses is modulated into an orbital angular momentum signal state and a decoy state with different average photon number intensities by the first intensity modulator, the orbital angular momentum signal state and the decoy state enters the second deformable mirror for phase correction, then it is transmitted from the second polarization beam splitter, and reaches the third telescope system through the first delayer, the first beam splitter and the first narrow-band filter; and finally, it is collimated by the third telescope system and sent to the measuring unit.

9. An OAM measurement device independent quantum key distribution method based on real-time tracking compensation, wherein the method is applied to the system according to claim 8, wherein, the method comprising the following steps:

S1, monitoring signal channel environment: the measuring unit emitting fundamental mode Gaussian pulse to the user Alice and the user Bob, the user Alice and the user Bob performing clock synchronization and anti-eavesdropping monitoring by using the pulses, and meanwhile estimating the atmospheric turbulence intensity according to the dispersion degree of the light spots of the incident Gaussian pulses; executing the next step when the intensity of the atmospheric turbulence is lower than the atmospheric strength threshold value and no eavesdropping is monitored;

S2, bit encoding: the user Alice and the user Bob randomly selecting an X base or a Y base to perform information coding, randomly coding bit information into 4 orbital angular momentum states by using a spatial light modulator, and then transmitting the bit information to a middle measuring unit; wherein when the first spatial light modulator and the second spatial light modulator encode orbital angular momentum, the first spatial light modulator and the second spatial light modulator randomly select one of four states $$\{|o\rangle, |e\rangle, \frac{1}{\sqrt{2}}(|o\rangle + |e\rangle), \frac{1}{\sqrt{2}}(|o\rangle - |e\rangle)\}$$

for encoding; X base represents $\{|o\rangle, |e\rangle\}$; Y base represents $$\left\{\frac{1}{\sqrt{2}}(|o\rangle + |e\rangle), \frac{1}{\sqrt{2}}(|o\rangle - |e\rangle)\right\},$$

and $|o\rangle$ and $$\frac{1}{\sqrt{2}}(|o\rangle + |e\rangle)$$

represent bit 0; $|e\rangle$ and $$\frac{1}{\sqrt{2}}(|o\rangle + |e\rangle)$$

represent bit 1; $|o\rangle$ and $|e\rangle$ respectively represent an orbital angular momentum state of odd topological charge numbers and an orbital angular momentum state of even topological charge numbers;

S3, Bell measurement: the measuring unit performing the measuring operation, then declaring which bits being successfully detected, and simultaneously publishing the measuring result; the user Alice and the user Bob reserving the bits data successfully detected and discarding the data of other code bits;

S4, pairing base: the user Alice and the user Bob performing base pairing through a public channel, selecting bits prepared under the same base, negotiating to perform bit inversion, and ensuring the consistency of the bits of both communication users; after these operations are completed, the reserved data being used as the original key;

S5, error code estimation: the user Alice and the user Bob generating a final security key by using an original key obtained from the X base, the original key obtained from the Y base being used as a test bit, detecting the error rate, if the error rate is higher than the error rate threshold value, which indicates the fact that eavesdropping exists, abandoning the communication process, and otherwise, reserving the remaining data to execute the next step, the remaining data refers to the secure key data generated from original key obtained under X basis under the condition that the detecting the bit-error rate of the original secret key obtained under the Y basis which is used as a test bit is within the error rate threshold value;

S6, key agreement: the user Alice and the user Bob performing error correction and private key amplification on the screened data by using the public classical channel, and after data coordination, the user Alice and the user Bob having consistent security keys.

10. The OAM measurement device independent quantum key distribution system based on real-time tracking compensation according to claim 1, wherein, the fourth telescope system of the user Bob receives the fundamental mode Gaussian pulse from the measuring unit, filters light outside a communication band through a second narrowband filter, and divides the incident fundamental mode Gaussian pulse into two paths of strong fundamental mode Gaussian pulse and weak fundamental mode Gaussian pulse through the second beam splitter, namely a strong upper branch and a weak lower branch; the upper branch is connected with a second charge coupled device provided for monitoring the intensity of laser pulses and wavefront phase distortion caused by atmospheric turbulence in real time and provides reference information for clock synchronization and phase distortion compensation; the lower branch is provided for modulating pulse loading phase information and is sequentially connected with the second delayer, the third polarization beam splitter, the third deformable mirror, the second half-wave plate, the second spatial light modulator and the second intensity modulator; the fundamental mode Gaussian pulse is split into the lower branch enters the second delayer, and enters the third polarization beam splitter after a certain time delay, the third polarization beam splitter reflects the fundamental mode Gaussian pulse to the third deformable mirror, and the third deformable mirror performs distortion compensation on a wavefront phase according to reference information provided by the upper branch; the fundamental mode Gaussian pulse after compensation is reflected to the second half-wave plate, the second half-wave plate turns the polarization state of the fundamental mode Gaussian pulse by 90 degrees and then enters the second spatial light modulator, and the second spatial light modulator encodes the fundamental mode Gaussian pulse with orbital angular momentum; the coded pulses is modulated into an orbital angular momentum signal state and a decoy state with different average photon number intensities by the second intensity modulator, the orbital angular momentum signal state and the decoy state enters the fourth deformable mirror for phase correction, then it is transmitted from the third polarization beam splitter, and reaches the fourth telescope system through the second delayer, the second beam splitter and the second narrow-band filter; and finally, it is collimated by the fourth telescope system and sent to the measuring unit.

11. An OAM measurement device independent quantum key distribution method based on real-time tracking compensation, wherein the method is applied to the system according to claim 10, wherein, the method comprising the following steps:

S1, monitoring signal channel environment: the measuring unit emitting fundamental mode Gaussian pulse to the user Alice and the user Bob, the user Alice and the user Bob performing clock synchronization and anti-eavesdropping monitoring by using the pulses, and meanwhile estimating the atmospheric turbulence intensity according to the dispersion degree of the light spots of the incident Gaussian pulses; executing the next step when the intensity of the atmospheric turbulence is lower than the atmospheric strength threshold value and no eavesdropping is monitored;

S2, bit encoding: the user Alice and the user Bob randomly selecting an X base or a Y base to perform information coding, randomly coding bit information into 4 orbital angular momentum states by using a spatial light modulator, and then transmitting the bit information to a middle measuring unit; wherein when the first spatial light modulator and the second spatial light modulator encode orbital angular momentum, the first spatial light modulator and the second spatial light modulator randomly select one of four states $$\{|o\rangle, |e\rangle, \frac{1}{\sqrt{2}}(|o\rangle + |e\rangle), \frac{1}{\sqrt{2}}(|o\rangle - |e\rangle)\}$$

for encoding; X base represents $\{|o\rangle, |e\rangle\}$; Y base represents $$\left\{\frac{1}{\sqrt{2}}(|o\rangle + |e\rangle), \frac{1}{\sqrt{2}}(|o\rangle - |e\rangle)\right\},$$

and $|o\rangle$ and $$\frac{1}{\sqrt{2}}(|o\rangle + |e\rangle)$$

represent bit 0; $|e\rangle$ and $$\frac{1}{\sqrt{2}}(|o\rangle + |e\rangle)$$

represent bit 1; $|o\rangle$ and $|e\rangle$ respectively represent an orbital angular momentum state of odd topological charge numbers and an orbital angular momentum state of even topological charge numbers;

S3, Bell measurement: the measuring unit performing the measuring operation, then declaring which bits being successfully detected, and simultaneously publishing the measuring result; the user Alice and the user Bob reserving the bits data successfully detected and discarding the data of other code bits;

S4, pairing base: the user Alice and the user Bob performing base pairing through a public channel, selecting bits prepared under the same base, negotiating to perform bit inversion, and ensuring the consistency of the bits of both communication users; after these operations are completed, the reserved data being used as the original key;

S5, error code estimation: the user Alice and the user Bob generating a final security key by using an original key obtained from the X base, the original key obtained from the Y base being used as a test bit, detecting the error rate, if the error rate is higher than the error rate threshold value, which indicates the fact that eavesdropping exists, abandoning the communication process, and otherwise, reserving the remaining data to execute the next step, the remaining data refers to the secure key data generated from original key obtained under X basis under the condition that the detecting the bit-error rate of the original secret key obtained under the Y basis which is used as a test bit is within the error rate threshold value;

S6, key agreement: the user Alice and the user Bob performing error correction and private key amplification on the screened data by using the public classical channel, and after data coordination, the user Alice and the user Bob having consistent security keys.

12. An OAM measurement device independent quantum key distribution system based on real-time tracking compensation according to claim 1, wherein, the first M-Z interferometer comprising a second 50/50 beam splitter, a third 50/50 beam splitter, a fifth mirror, a sixth mirror, a first dove prism and a second dove prism; the second M-Z interferometer comprising a fourth 50/50 beam splitter, a fifth 50/50 beam splitter, a seventh mirror, an eighth mirror, a third dove prism and a fourth dove prism.

13. An OAM measurement device independent quantum key distribution method based on real-time tracking compensation, wherein the method is applied to the system according to claim 12, wherein, the method comprising the following steps:

S1, monitoring signal channel environment; the measuring unit emitting fundamental mode Gaussian pulse to the user Alice and the user Bob, the user Alice and the user Bob performing clock synchronization and anti-eavesdropping monitoring by using the pulses, and meanwhile estimating the atmospheric turbulence intensity according to the dispersion degree of the light spots of the incident Gaussian pulses; executing the next step when the intensity of the atmospheric turbulence is lower than the atmospheric strength threshold value and no eavesdropping is monitored;

S2, bit encoding: the user Alice and the user Bob randomly selecting an X base or a Y base to perform information coding, randomly coding bit information into 4 orbital angular momentum states by using a spatial light modulator, and then transmitting the bit information to a middle measuring unit; wherein when the first spatial light modulator and the second spatial light modulator encode orbital angular momentum, the first spatial light modulator and the second spatial light modulator randomly select one of four states $$\{|o\rangle, |e\rangle, \frac{1}{\sqrt{2}}(|o\rangle + |e\rangle), \frac{1}{\sqrt{2}}(|o\rangle - |e\rangle)\}$$

for encoding; X base represents $\{|o\rangle, |e\rangle\}$; Y base represents $$\left\{\frac{1}{\sqrt{2}}(|o\rangle + |e\rangle), \frac{1}{\sqrt{2}}(|o\rangle - |e\rangle)\right\},$$

and $|o\rangle$ and $$\frac{1}{\sqrt{2}}(|o\rangle + |e\rangle)$$

represent bit 0; $|e\rangle$ and $$\frac{1}{\sqrt{2}}(|o\rangle + |e\rangle)$$

represent bit 1; $|o\rangle$ and $|e\rangle$ respectively represent an orbital angular momentum state of odd topological charge numbers and an orbital angular momentum state of even topological charge numbers;

S3, Bell measurement: the measuring unit performing the measuring operation, then declaring which bits being successfully detected, and simultaneously publishing the measuring result; the user Alice and the user Bob reserving the bits data successfully detected and discarding the data of other code bits;

S4, pairing base: the user Alice and the user Bob performing base pairing through a public channel, selecting bits prepared under the same base, negotiating to perform bit inversion, and ensuring the consistency of the bits of both communication users; after these operations are completed, the reserved data being used as the original key;

S5, error code estimation: the user Alice and the user Bob generating a final security key by using an original key obtained from the X base, the original key obtained from the Y base being used as a test bit, detecting the error rate, if the error rate is higher than the error rate threshold value, which indicates the fact that eavesdropping exists, abandoning the communication process, and otherwise, reserving the remaining data to execute the next step, the remaining data refers to the secure key data generated from original key obtained under X basis under the condition that the detecting the bit-error rate of the original secret key obtained under the Y basis which is used as a test bit is within the error rate threshold value;

S6, key agreement: the user Alice and the user Bob performing error correction and private key amplification on the screened data by using the public classical channel, and after data coordination, the user Alice and the user Bob having consistent security keys.

14. An OAM measurement device independent quantum key distribution system based on real-time tracking compensation according to claim 1, wherein, the quantum channel is a free space channel or an optical fiber channel.

15. An OAM measurement device independent quantum key distribution method based on real-time tracking compensation, wherein the method is applied to the system according to claim 14, wherein, the method comprising the following steps:

S1, monitoring signal channel environment: the measuring unit emitting fundamental mode Gaussian pulse to the user Alice and the user Bob, the user Alice and the user Bob performing clock synchronization and anti-eavesdropping monitoring by using the pulses, and meanwhile estimating the atmospheric turbulence intensity according to the dispersion degree of the light spots of the incident Gaussian pulses; executing the next step when the intensity of the atmospheric turbulence is lower than the atmospheric strength threshold value and no eavesdropping is monitored;

S2, bit encoding: the user Alice and the user Bob randomly selecting an X base or a Y base to perform information coding, randomly coding bit information into 4 orbital angular momentum states by using a spatial light modulator, and then transmitting the bit information to a middle measuring unit; wherein when the first spatial light modulator and the second spatial light modulator encode orbital angular momentum, the first spatial light modulator and the second spatial light modulator randomly select one of four states $$\{|o\rangle, |e\rangle, \frac{1}{\sqrt{2}}(|o\rangle + |e\rangle), \frac{1}{\sqrt{2}}(|o\rangle - |e\rangle)\}$$

for encoding; X base represents $\{|o\rangle, |e\rangle\}$; Y base represents $$\left\{\frac{1}{\sqrt{2}}(|o\rangle + |e\rangle), \frac{1}{\sqrt{2}}(|o\rangle - |e\rangle)\right\},$$

and $|o\rangle$ and $$\frac{1}{\sqrt{2}}(|o\rangle + |e\rangle)$$

represent bit 0, $|e\rangle$ and $$\frac{1}{\sqrt{2}}(|o\rangle + |e\rangle)$$

represent bit 1, $|o\rangle$ and $|e\rangle$ respectively represent an orbital angular momentum state of odd topological charge numbers and an orbital angular momentum state of even topological charge numbers;

S3, Bell measurement: the measuring unit performing the measuring operation, then declaring which bits being successfully detected, and simultaneously publishing the measuring result; the user Alice and the user Bob reserving the bits data successfully detected and discarding the data of other code bits;

S4, pairing base: the user Alice and the user Bob performing base pairing through a public channel, selecting bits prepared under the same base, negotiating to perform bit inversion, and ensuring the consistency of the bits of both communication users; after these operations are completed, the reserved data being used as the original key;

S5, error code estimation: the user Alice and the user Bob generating a final security key by using an original key obtained from the X base, the original key obtained from the Y base being used as a test bit, detecting the error rate, if the error rate is higher than the error rate threshold value, which indicates the fact that eavesdropping exists, abandoning the communication process, and otherwise, reserving the remaining data to execute the next step, the remaining data refers to the secure key data generated from original key obtained under X basis under the condition that the detecting the bit-error rate of the original secret key obtained under the Y basis which is used as a test bit is within the error rate threshold value;

S6, key agreement: the user Alice and the user Bob performing error correction and private key amplification on the screened data by using the public classical channel, and after data coordination, the user Alice and the user Bob having consistent security keys.

16. An OAM measurement device independent quantum key distribution method based on real-time tracking compensation, wherein the method is applied to the system according to claim 1, the method comprising the following steps:

S1, monitoring signal channel environment: the measuring unit emitting fundamental mode Gaussian pulse to the user Alice and the user Bob, the user Alice and the user Bob performing clock synchronization and anti-eavesdropping monitoring by using the pulses, and meanwhile estimating the atmospheric turbulence intensity according to the dispersion degree of the light spots of the incident Gaussian pulses; executing the next step when the intensity of the atmospheric turbulence is lower than the atmospheric strength threshold value and no eavesdropping is monitored;

S2, bit encoding: the user Alice and the user Bob randomly selecting an X base or a Y base to perform information coding, randomly coding bit information into 4 orbital angular momentum states by using a spatial light modulator, and then transmitting the bit information to a middle measuring unit; wherein when the first spatial light modulator and the second spatial light modulator encode orbital angular momentum, the first spatial light modulator and the second spatial light modulator randomly select one of four states $$\{|o\rangle, |e\rangle, \frac{1}{\sqrt{2}}(|o\rangle + |e\rangle), \frac{1}{\sqrt{2}}(|o\rangle - |e\rangle)\}$$

for encoding; X base represents $\{|o\rangle, |e\rangle\}$; Y base represents $$\left\{\frac{1}{\sqrt{2}}(|o\rangle + |e\rangle), \frac{1}{\sqrt{2}}(|o\rangle - |e\rangle)\right\},$$

and $|o\rangle$ and $$\frac{1}{\sqrt{2}}(|o\rangle + |e\rangle)$$

represent bit 0; $|e\rangle$ and $$\frac{1}{\sqrt{2}}(|o\rangle + |e\rangle)$$

represent bit 1, $|o\rangle$ and $|e\rangle$ respectively represent an orbital angular momentum state of odd topological charge numbers and an orbital angular momentum state of even topological charge numbers;

S3, Bell measurement: the measuring unit performing the measuring operation, then declaring which bits being successfully detected, and simultaneously publishing the measuring result; the user Alice and the user Bob reserving the bits data successfully detected and discarding the data of other code bits;

S4, pairing base: the user Alice and the user Bob performing base pairing through a public channel, selecting bits prepared under the same base, negotiating to perform bit inversion, and ensuring the consistency of the bits of both communication users; after these operations are completed, the reserved data being used as the original key;

S5, error code estimation: the user Alice and the user Bob generating a final security key by using an original key obtained from the X base, the original key obtained from the Y base being used as a test bit, detecting the error rate, if the error rate is higher than the error rate threshold value, which indicates the fact that eavesdropping exists, abandoning the communication process, and otherwise, reserving the remaining data to execute the next step, the remaining data refers to the secure key data generated from original key obtained under X basis under the condition that the detecting the bit-error rate of the original secret key obtained under the Y basis which is used as a test bit is within the error rate threshold value;

S6, key agreement: the user Alice and the user Bob performing error correction and private key amplification on the screened data by using the public classical channel, and after data coordination, the user Alice and the user Bob having consistent security keys.

17. The OAM measurement device independent quantum key distribution method based on real-time tracking compensation according to claim 16, wherein, when the bit encoding is performed, the user Alice and the user Bob randomly selecting the orbital angular momentum states or the superposition states of odd topology charges numbers or orbital angular momentum states or the superposition states of even topology charges numbers to perform encoding, and allowing a group of mutually unbiased bases to be formed by any odd-numbered or even-numbered orbital angular momentum states to perform encoding.

18. An OAM measurement device independent quantum key distribution method based on real-time tracking compensation, wherein the method is applied to the system according to claim 1, wherein, the method comprising the following steps:

S1, monitoring signal channel environment: the measuring unit emitting fundamental mode Gaussian pulses to the user Alice and the user Bob, the user Alice and the user Bob performing clock synchronization and anti-eavesdropping monitoring by using the fundamental mode Gaussian pulses, and meanwhile estimating the atmospheric turbulence intensity according to the dispersion degree of the light spots of the incident Gaussian pulses; executing the next step when the intensity of the atmospheric turbulence is lower than the atmospheric strength threshold value and no eavesdropping is monitored;

S2, bit encoding: the user Alice and the user Bob randomly selecting an X base or a Y base to perform information coding, randomly coding bit information into 4 orbital angular momentum states by using a spatial light modulator, and then transmitting the bit information to a middle measuring unit; wherein when the first spatial light modulator and the second spatial light modulator encode orbital angular momentum, the first spatial light modulator and the second spatial light modulator randomly select one of four states $$\{|o\rangle, |e\rangle, \frac{1}{\sqrt{2}}(|o\rangle + |e\rangle), \frac{1}{\sqrt{2}}(|o\rangle - |e\rangle)\}$$

for encoding; X base represents $\{|o\rangle, |e\rangle\}$; Y base represents $$\left\{\frac{1}{\sqrt{2}}(|o\rangle + |e\rangle), \frac{1}{\sqrt{2}}(|o\rangle - |e\rangle)\right\},$$

and $|o\rangle$ and $$\frac{1}{\sqrt{2}}(|o\rangle + |e\rangle)$$

represent bit 0, $|e\rangle$ and $$\frac{1}{\sqrt{2}}(|o\rangle + |e\rangle)$$

represent bit 1; $|o\rangle$ and $|e\rangle$ respectively represent an orbital angular momentum state of odd topological charge numbers and an orbital angular momentum state of even topological charge numbers;

S3, Bell measurement: the measuring unit performing the measuring operation, then declaring which bits being successfully detected, and simultaneously publishing the measuring result; the user Alice and the user Bob reserving the bits data successfully detected and discarding the data of other code bits;

S4, pairing base: the user Alice and the user Bob performing base pairing through a public channel, selecting bits prepared under the same base, negotiating to perform bit inversion, and ensuring the consistency of the bits of both communication users; after these operations are completed, the reserved data being used as the original key;

S5, error code estimation: the user Alice and the user Bob generating a final security key by using an original key obtained from the X base, the original key obtained from the Y base being used as a test bit, detecting the error rate, if the error rate is higher than the error rate threshold value, which indicates the fact that eavesdropping exists, abandoning the communication process, and otherwise, reserving the remaining data to execute the next step, the remaining data refers to the secure key data generated from original key obtained under X basis under the condition that the detecting the bit-error rate of the original secret key obtained under the Y basis which is used as a test bit is within the error rate threshold value;

S6, key agreement: the user Alice and the user Bob performing error correction and private key amplification on the screened data by using the public classical channel, and after data coordination, the user Alice and the user Bob having consistent security keys.

19. The OAM measurement device independent quantum key distribution method based on real-time tracking compensation according to claim 18, wherein, when the bit encoding is performed, the user Alice and the user Bob randomly selecting the orbital angular momentum states or the superposition states of odd topology charges numbers or orbital angular momentum states or the superposition states of even topology charges numbers to perform encoding, and allowing a group of mutually unbiased bases to be formed by any odd-numbered or even-numbered orbital angular momentum states to perform encoding.

\* \* \* \* \*